Aug. 18, 1925. Re. 16,145
J. C. WAHL
TOGGLE JOINT SELF FILLING PEN
Original Filed Jan. 5, 1918
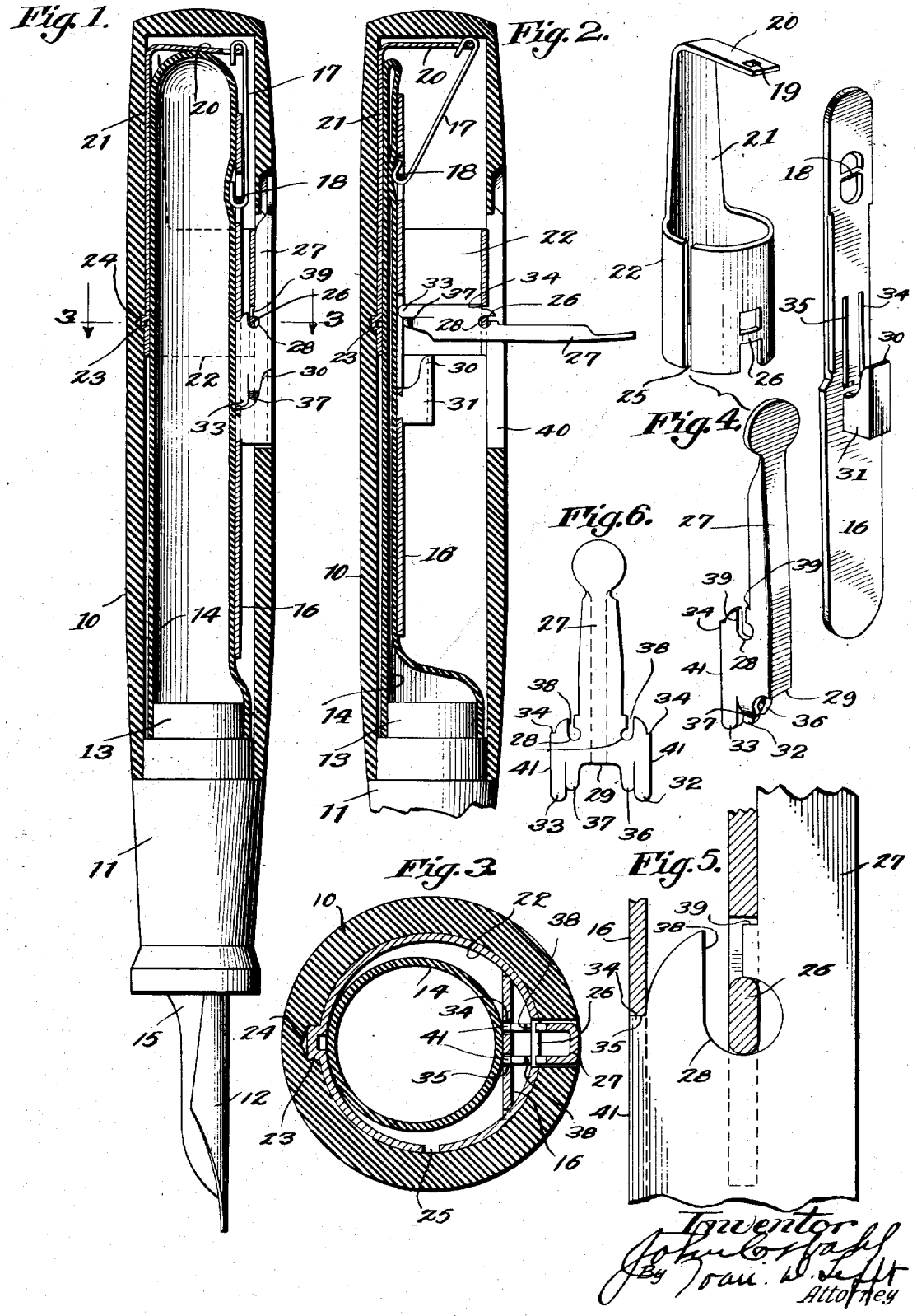
Inventor
John C. Wahl
By Frank W. Jeffs
Attorney Reissued Aug. 18, 1925. Re. 16,145

UNITED STATES PATENT OFFICE.

JOHN C. WAHL, OF CHICAGO, ILLINOIS, ASSIGNOR TO THE WAHL COMPANY, OF WILMINGTON, DELAWARE, A CORPORATION OF DELAWARE.

TOGGLE-JOINT SELF-FILLING PEN.

Original No. 1,365,754, dated January 18, 1921, Serial No. 210,515, filed January 5, 1918. Application for reissue filed February 17, 1923. Serial No. 619,757.

*To all whom it may concern:*

Be it known that I, JOHN C. WAHL, a citizen of the United States, residing at Chicago, in the county of Cook and State of Illinois, have invented certain new and useful Improvements in Toggle-Joint Self-Filling Pens, of which the following is a specification.

My invention is a self filling fountain pen in which the ink is contained in a deflatable sack, and a lever is provided for deflating the sack for the purpose of refilling the pen with ink.

The object of my invention is to improve certain structural details of pens of this type and to provide a structure which shall be susceptible of cheap and accurate manufacture and which may be readily assembled in the position in which it is to be used.

Particularly my invention includes a shell member provided with an integral pivot and with a resiliently active member and a lever pivotally related to the shell and a relative arrangement of the pivotally supported lever and the resiliently active member on the shell active to hold the lever in closed position.

Also it includes structural formation and process of making a lever to present normal open pivoting centers that may be closed to form a pivot and may be open in order that the lever may be detached.

My invention will be best understood by reference to the following figures, of which—

Figure 1 is a longitudinal section of the pen;

Fig. 2 is a fragmentary longitudinal section with the lever in its operative position;

Fig. 3 is a section along the line 3—3 of Fig. 1;

Fig. 4 is a disassembled view of some details;

Fig. 5 is a detail view, and

Fig. 6 is a view of the blank from which the pen lever is made.

Referring to the figures, 10 is an outside casing preferably made of hard rubber, which serves as a support for a plug 11, in which is mounted the pen nib, 12, and which is provided at its rear end with a nipple, 13, on which is placed a rubber sack 14, serving as a container for the ink. The nib 12 is provided with the customary feeding nib 15, which is of course provided with suitable channels for the supplying of ink to the nib 12. Since the particular means of keeping the pen 12 supplied with ink do not form a part of my present invention, I will omit the description. Ink feeds are well known in the art and any suitable construction may be used in connection with my herein described invention.

In pens of the type herein described, it is necessary to provide means for deflating the ink sack when it is desired to refill the same, the customary procedure being to deflate the sack, then inserting the pen nib 12 into a supply of ink and allowing the sack to expand, thus refilling itself with ink by suction. For the purpose of readily deflating the ink sack 14, I have provided the presser bar 16, which extends practically the entire length of said sack and have supported said presser bar by a flat link 17, which is pivoted on a bar 18 in the presser bar and is also pivoted in a slot 19 in the end of a spring 20. The spring 20 is the rear end of a support 21, which is made of spring steel and serves as a support for the lever and presser bar action, as will hereinafter be described. The support 21 has a shell 22, which is formed into a circular shape, approximately the diameter of the interior of the casing 10, and said shell 22 is provided with a small projection 23, which registers with a hole 24 in the interior of the casing 10, thus serving to hold the support 21 firmly in its proper position. The shell 22 is normally somewhat larger than the interior of the casing 10, but since the shell 22 is provided with a slot 25, the circular section of the support may be sprung into its place in the interior of the casing.

Opposite the projection 23 is a pivot bar 26, which is formed in the shell 22, as shown in Fig. 4. The pivot bar 26 serves as a support for the lever 27, by means of which the presser bar 16 is operated. The lever 27 is formed from a piece of flat stock of approximately the outline as shown in Fig. 6 and when formed into shape provides a pivot hole 28, which engages the pivot bar 26 and an operating shoulder 29, which engages the surface 30 of a lug 31, which is riveted in the presser bar 16. The lever 27 is also provided with a pair of ears 32 and 33, which register with slots 34 and 35 in the presser bar 16. When the lever is in the position in Fig. 2, contact with the presser bar 16 is made by a pair of lugs 36 and 37, which are also formed on the lever 27. The pivot holes 28 are provided with slots 38, for the purpose of allowing disengagement of the lever 27 from the pivot bar 26.

It is to be noted when the lever 27 is in its normal position, as shown in Fig. 1, that the tension of the spring 20 is transmitted through the link 17 to the presser bar 16, and by means of the lug 31 riveted therein to the surface 29 of the lever 27. Since when the lever is in its closed position the surface 29 is above the pivot bar 26, the tension of the spring 20 will thus serve to hold the lever 27 firmly in its closed position, the action being a species of toggle joint. The lever 27 is provided on its under side with shoulders 39, which, when the lever 27 is in its open position (Fig. 2) contact with the interior of the shell 22 and thus determine the open position of lever 27.

In assembling my improved pen, the link 17 is first attached to the bar 18, then to the end of the spring 20. These three parts are then pushed into the interior of the casing 10 and when the projection 23 reaches the hole 24 it will snap therein, thereby holding the shell and its associated parts firmly in the interior of the casing 10. The casing 10 is provided with a slot 40, and the pivot bar 26 is so situated with reference to the projection 23 that when the projection 23 is located by the hole 24, the pivot bar 26 will lie across the slot 40. The lever 27 is then inserted by placing the pivot hole 28 over the pivot bar 26, the slot 38 permitting such action. After this has been done, the plug 11 which serves as a support for the nib 12 and the sack 14 is then inserted in the casing 10 and the pen is ready for use.

It will be observed that when the lever 27 is in its closed position, as shown in Fig. 1, the under part 41 of the lever 27 will lie in the slots 34 and 35 of the presser bar 16, and also when the lever is in its open position, as shown in Fig. 2, that said slots will be engaged by the ears 32 and 33. The presser bar is thus at all times maintained in its proper position.

It will be observed that the operating parts of my herein described pen are all made from pieces which can be made by punch press operations, and as a result of this cheapness and accuracy are obtained.

My herein described construction has the great advantage that all of the operating parts, that is, the lever 27, the link 17 and the presser bar 16 may be assembled on the shell 22 and adjusted to their correct position prior to inserting these parts in the casing 10. I also wish to point out that the only connection of these parts with the casing 10 is through the medium of the locating lug 23, which locates the parts by means of the hole 24. It is therefore possible to maintain the positions of these operating parts with great exactness, something which would not be possible if certain parts, for instance, the pivot bar 26, where wholly or in part supported by the rubber casing 10. After the pivot and presser bar action has been tested as just described, the lever 27 may be taken off of the shell 22 and said shell inserted into the casing 10 as hereinbefore described.

Many changes and alterations may be made in the precise structure herein described without departing from the spirit of my invention, since I claim:

1. In a fountain pen, the combination of a casing, a deflatable sack inserted in said casing, an operating lever for said sack, a pivot for said operating lever, and a shell having said pivot integral therewith adapted to be inserted in said casing and extending longitudinally thereof a distance greater than the diameter of said pivot.

2. In a fountain pen, the combination of a casing, a deflatable sack inserted in said casing, an operating lever for said sack, a pivot for said operating lever, said operating lever being removably mounted on said pivot, and a shell having said pivot integral therewith adapted to be inserted in said casing and extending longitudinally thereof a distance greater than the diameter of said pivot.

3. In a fountain pen, the combination of a casing, a shell adapted to be inserted in said casing, a pivot integral with said shell, and an operating lever formed of a single piece folded longitudinally and having slotted pivot holes therein mounted on said pivot.

4. In a fountain pen; the combination of an outside casing; a deflatable sack; a presser bar; a shell adapted to be sprung in said casing having one of its extremities so bent as to form a laterally extending spring; and a link pivotally mounted on said spring, the opposite end of said link being pivotally connected with the pressure bar.

5. In a fountain pen, the combination of an outside casing, a deflatable sack, a presser bar, a shell adapted to be sprung in said casing, and having a spring at one end, a link mounted on said spring, a presser bar attached to said link, and a lever for actuating said presser bar pivoted on said shell.

6. In a fountain pen, the combination of an outside casing, a deflatable sack, a presser bar, a shell adapted to be sprung in said casing and having a spring at one end, a link mounted on said spring, a presser bar attached to the said link, and a lever for operating said presser bar removably pivoted on said shell.

7. In a fountain pen, the combination of a casing, a shell, a casing locating means to locate said shell in its proper position relative to said casing, a spring attached to said shell, a link attached to said spring, a presser bar for the deflatable sack attached to said link, a pivot integral with said shell, and an operating lever for said presser bar mounted on said pivot.

8. In a fountain pen, the combination with a presser bar, of a lever formed of a single piece of flat stock folded longitudinally, said lever having a portion adapted to be pivoted relative to said casing, a second portion defining the open position of said lever, a third portion adapted to contact with said presser bar and thereby operate the same, and a fourth portion adapted to engage said presser bar and hold said presser bar from shifting while said presser bar is operated by the third portion of said lever.

9. In a fountain pen, the combination of a casing, a shell adapted to be sprung in said casing, said shell having its rear portion extending into a spring and being provided with a pivot portion integral with said shell, a presser bar, a lug on said presser bar, a link connecting said presser bar and said spring, a lever mounted on said pivot, said lever being so mounted in relation to said lug and spring that the lever will be held in its closed position by the action of said spring when said lever and said lug are in engagement.

10. A lever for a fountain pen comprising a main body portion and flange members thereon provided with incut marginal pivot seats adapted to engage a pivot and to be closed thereabout.

11. In a fountain pen, in combination, a slotted casing, a slotted shell having a pivot formed thereon and being so positioned to place the pivot across the slot in said shell, a spring member associated with the said shell and active longitudinally thereof, a lever mounted on the pivot member, a presser bar, an ink sack mounted below the presser bar, and a connection relationing of the lever to the spring member so that the said lever will be locked in closed position by the resilient action of the said spring member against the presser bar.

12. In a fountain pen, a slotted casing having a pivot associated with the slot, a lever comprising a body portion and side flanges, said side flanges each having a slot formed therein to permit the lever to be attached to said pivot by a longitudinal sliding movement and then be rotated thereabout.

13. In a fountain pen, a slotted casing, a shell adapted to be inserted longitudinally in said casing, a portion of said shell being cut away to form a pivot integral therewith to be positioned below the slot in the casing to extend thereacross, and a lever pivotally mounted on said pivot to extend through the casing slot.

14. In a fountain pen, a slotted casing, a shell adapted to be inserted longitudinally in said casing, a portion of said shell being cut away to form a pivot integral therewith to be positioned below the slot in the casing to extend thereacross, a lever pivotally mounted on said pivot to extend through the casing slot, a presser bar, and a spring associated with said shell and operatively connected to said presser bar.

In witness whereof I have hereunto subscribed my name.

JOHN C. WAHL.